(12) United States Patent
Lee et al.

(10) Patent No.: US 11,556,271 B2
(45) Date of Patent: Jan. 17, 2023

(54) STORAGE DEVICE STORING DATA ON KEY-VALUE BASIS AND OPERATING METHOD THEREOF

(71) Applicant: Samsung Electronics Co., Ltd., Suwon-si (KR)

(72) Inventors: Byungki Lee, Hwaseong-si (KR); Satish Kumar, Suwon-si (KR); Jaeju Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 93 days.

(21) Appl. No.: 16/844,119

(22) Filed: Apr. 9, 2020

(65) Prior Publication Data

US 2021/0004177 A1    Jan. 7, 2021

(30) Foreign Application Priority Data

Jul. 5, 2019 (KR) .......................... 10-2019-0081522

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0655; G06F 3/0679; G06F 16/22; G06F 3/0638
See application file for complete search history.

(56) References Cited

U.S. PATENT DOCUMENTS

| | | | |
|---|---|---|---|
| 9,311,252 B2 | 4/2016 | Fong et al. | |
| 9,772,939 B2 | 9/2017 | Gupta et al. | |
| 10,055,162 B2 | 8/2018 | Jannen et al. | |
| 10,216,418 B2 | 2/2019 | Choi et al. | |
| 2017/0249257 A1 | 8/2017 | Bonnet et al. | |
| 2018/0081565 A1* | 3/2018 | Tan .................... | G06F 3/0656 |
| 2018/0225315 A1 | 8/2018 | Boles et al. | |
| 2018/0225316 A1* | 8/2018 | Boles ................. | G06F 16/2246 |
| 2018/0253386 A1* | 9/2018 | Qiu ..................... | G06F 3/061 |
| 2018/0300350 A1 | 10/2018 | Mainali et al. | |
| 2018/0349095 A1 | 12/2018 | Wu et al. | |
| 2020/0117728 A1* | 4/2020 | Tomlinson .......... | G06F 16/2246 |
| 2020/0334292 A1* | 10/2020 | Ganeshan ............ | G06F 16/907 |

* cited by examiner

*Primary Examiner* — Jane W Benner
(74) *Attorney, Agent, or Firm* — Muir Patent Law, PLLC

(57) ABSTRACT

A storage device includes a controller configured to: receive, from a host, a plurality of key-value pairs, separate a key from each of the plurality of key-value pairs and a value therefrom, and generate a first key stream by merging a plurality of keys separated from the plurality of key-value pairs, and non-volatile memory configured to store the first key stream. The first key stream is stored, separately from the value separated from each of the plurality of key-value pairs, in the non-volatile memory.

10 Claims, 16 Drawing Sheets

MMT

| ADDR | VD1 | VD2 | VD3 |
|------|-----|-----|-----|
| PPN1 | 1 | 0 | 1 |
| PPN2 | 1 | 1 | 1 |
| PPN3 | 0 | 0 | 0 |
| PPN4 | 1 | 1 | 0 |

STORAGE DEVICE STORING DATA ON KEY-VALUE BASIS AND OPERATING METHOD THEREOF

CROSS-REFERENCE TO RELATED APPLICATION

This application claims priority under 35 U.S.C. § 119 to Korean Patent Application No. 10-2019-0081522, filed on Jul. 5, 2019, in the Korean Intellectual Property Office, the disclosure of which is incorporated herein in its entirety by reference.

BACKGROUND

The inventive concept relates to a storage device and an operating method of the storage device, and more particularly, to a storage device storing data on a key-value basis and an operating method of the storage device.

Recently, various types of electronic devices have been used. Some electronic devices may store data and may be operated based on the stored data. For this purpose, electronic devices may include storage devices or storage systems for storing data or may store or read data while communicating with external storage devices or storage systems.

Storage devices may be variously classified. For example, storage devices may be classified into non-volatile memory-based storage and volatile memory-based storage. Non-volatile memory-based storage may not lose data even when not supplied with power. On the other hand, although data stored in volatile memory-based storage may be lost when power supplied to volatile memory-based storage is interrupted, volatile memory-based storage may be operated faster than non-volatile memory-based storage.

For example, storage devices may be classified into block storage, file storage, and object storage. Block storage may manage data based on physical locations, and file storage may manage data based on logical sequence. On the other hand, object storage may manage data based on unique identifiers. Block storage and file storage are useful when there is a large amount of text data, whereas object storage may be an efficient alternative when there is a large amount of unstructured data such as sound data, image data, and the like. As an example of object storage, there is key-value storage which stores data on a key-value basis.

SUMMARY

The inventive concept provides a storage device efficiently managing keys and values and an operating method of the storage device.

The inventive concept also provides a storage device efficiently performing compaction on keys and values and an operating method of the storage device.

According to an exemplary embodiment of the present invention, a storage device includes a controller configured to: receive, from a host, a plurality of key-value pairs, separate a key from each of the plurality of key-value pairs and a value therefrom, and generate a first key stream by merging a plurality of keys separated from the plurality of key-value pairs, and non-volatile memory configured to store the first key stream. The first key stream is stored, separately from the value separated from each of the plurality of key-value pairs, in the non-volatile memory.

According to an exemplary embodiment of the present invention, an operating method of a storage device which comprises non-volatile memory and a controller controlling the non-volatile memory includes receiving, by the controller, a plurality of key-value pairs, generating, by the controller, a first key stream by extracting a key from each of the plurality of key-value pairs, and storing, by the controller, the first key stream in the non-volatile memory.

According to an exemplary embodiment of the present invention, an operating method of a storage device which comprises non-volatile memory and a controller controlling the non-volatile memory includes generating, by the controller, a data stream from a plurality of pages of data, storing, by the controller, the data stream in the non-volatile memory, generating, by the controller, a multi-map table which includes a physical address of a first page of data of the plurality of pages of data in the non-volatile memory, and at least one validity bit indicating whether a corresponding page of the plurality of pages of data comprised in the data stream is valid, and updating, by the controller in response to the first page of data of the plurality of pages of data being invalid, the multi-map table with a first validity bit indicating whether the first page of data is valid or not.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
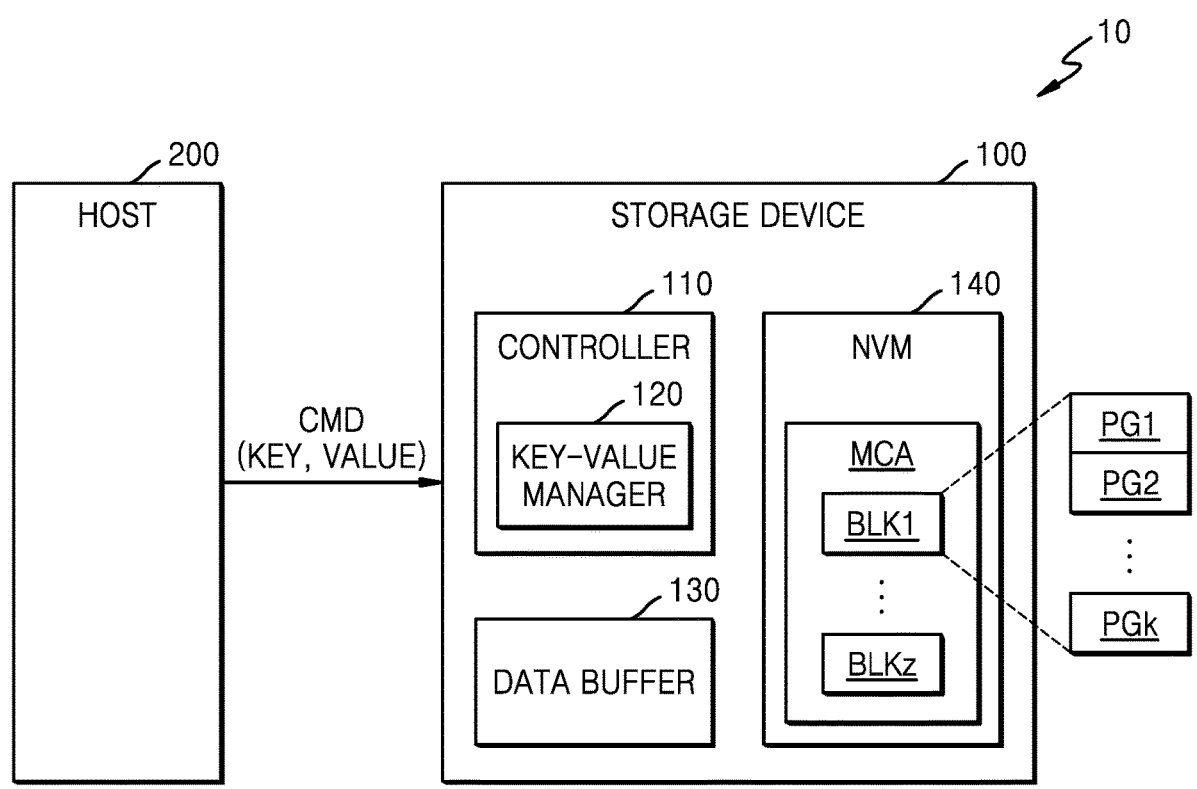
FIG. 1 is a block diagram illustrating a storage system according to an example embodiment of the inventive concept.

FIG. 1 is a block diagram illustrating a storage system according to an example embodiment of the inventive concept.

Referring to FIG. 1, a storage system 10 may include a storage device 100 and a host 200, and the storage device 100 may include a controller 110, a data buffer 130, and non-volatile memory (NVM) 140. The host 200 may communicate with the storage device 100 via various interfaces. For example, the host 200 may be implemented with an application processor (AP) or a system-on-chip (SoC).

In one embodiment, the storage device 100 may be a key-value storage device or a key-value store, for example, a key-value solid state drive (SSD). The key-value storage device is a device quickly and simply processing data by using a key-value pair. As used herein, the term "key-value pair" may refer to a pair of a key having uniqueness and a value that is data corresponding to (i.e., associated with) the key, and may be referred to as the term "tuple" or "key-value tuple". In the key-value pair, the key may be represented by any string such as a file name, a uniform resource identifier (URI), or a hash, and the value may be any kind of data such as an image, a user preference file, or a document. Here, sizes of the key and the value may be variable, and, for example, the size of the value may vary with data included in the value.

Hereinafter, an embodiment, in which the storage device 100 is a key-value storage device, will be described, and in the specification, the storage device 100 may have the same meaning as a key-value storage device or a key-value store. However, the storage device 100 is not limited to a key-value storage device and may be applied to any object cache system or object storage system managing data in a unit of an object. Therefore, the storage device 100 may manage data in units of an object, in any manner other than in the manner of a key-value pair.

The host 200 may transmit, to the storage device 100, a command CMD for writing data including a key-value pair, for example, a write request or a put command, and the storage device 100 may write a value VALUE to the non-volatile memory 140 in response to the command CMD. In one embodiment, the host 200 may transmit, to the storage device 100, a command CMD including a key KEY, for example, a read request or a get command, and the storage device 100 may read the value VALUE corresponding to the key KEY from the non-volatile memory 140 in response to the command CMD.

The controller 110 may control the non-volatile memory 140 such that a value is written to the non-volatile memory 140 in response to a write request from the host 200, or such that a value stored in the non-volatile memory 140 is read in response to a read request from the host 200. The controller 110 may include a key-value manager 120.

The key-value manager 120 may receive a key-value pair included in the command CMD and may separate, from each other, keys and values, both included in the key-value pair. For example, the key-value manager 120 may separate a plurality of keys KEY from the key-value pair, and may also separate a plurality of values VALUE from the key-value pair. The key-value manager 120 may extract the plurality of keys KEY included in the key-value pair and may store the plurality of keys KEY in the data buffer 130. The key-value manager 120 may extract the plurality of values VALUE included in the key-value pair and may store the plurality of values VALUE in the data buffer 130.

When the plurality of keys KEY, which are present by as much as a certain number or a certain amount of data, are stored in the data buffer 130, the key-value manager 120 may store the stored plurality of keys KEY as a key stream in the non-volatile memory 140. When the plurality of values VALUE, which are present by as much as a certain number or a certain amount of data, are stored in the data buffer 130, the key-value manager 120 may store the stored plurality of values VALUE as a value stream in the non-volatile memory 140. In one embodiment, the value stream and the key stream may be respectively stored in different areas of the non-volatile memory 140.

In one embodiment, the value VALUE may have a greater amount of data than the key KEY, and according to the inventive concept, the key-value manager 120 may separate the key-value pair and manage separately the KEY and the value VALUE, whereby an amount of input/output data with respect to the non-volatile memory 140 may be reduced, and as a result, a data processing capability for the key-value pair may be improved.

The data buffer 130 may include at least one memory device for storing the key KEY and the value VALUE, and in one example, the data buffer 130 may include a volatile memory device such as dynamic random access memory (DRAM) or static random access memory (SRAM).

The non-volatile memory 140 may include a memory cell array MCA, the memory cell array MCA may include memory blocks BLK1 to BLKz, and the memory block BLK1 may include a plurality of pages PG1 to PGk. Here, each of z and k may be a positive integer and may variously vary depending upon embodiments. For example, a memory block may be a unit of erasure, and a page may be a unit of writing or reading. In some embodiments, the memory cell array MCA may include a plurality of planes, a plurality of dies, or a plurality of chips. In one embodiment, the non-volatile memory 140 may include a flash memory device, for example, a NAND flash memory device. However, the inventive concept is not limited thereto, and the non-volatile memory 140 may include a resistive memory device such as resistive RAM (ReRAM), phase-change RAM (PRAM), or magnetic RAM (MRAM).

The storage system 10 may be implemented as, for example, a personal computer (PC), a data server, network-attached storage, an Internet-of-Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, e-book, a wearable device, or the like.

In some embodiments, the storage device 100 may be an internal memory embedded in an electronic device. For example, the storage device 100 may be an SSD, an embedded universal flash storage (UFS) memory device, or an embedded multimedia card (eMMC). In some embodiments, the storage device 100 may be an external memory attachable to and detachable from an electronic device. For example, the storage device 100 may include a UFS memory card, a Compact Flash (CF) memory card, a Secure Digital (SD) memory card, a Micro-Secure Digital (Micro-SD) memory card, a Mini-Secure Digital (Mini-SD) memory card, an extreme Digital (xD) memory card, or a memory stick.

Figure 2:
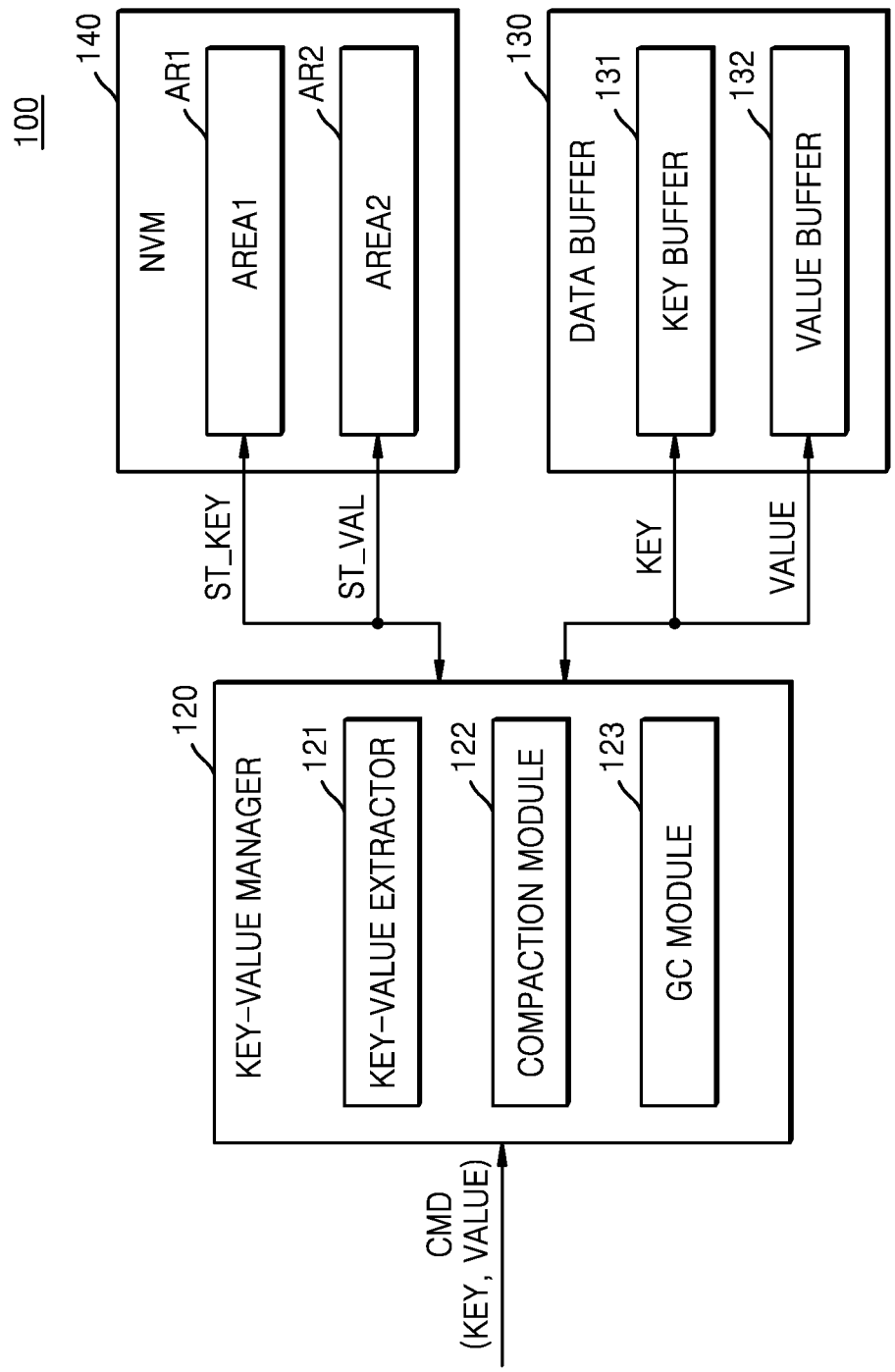
FIG. 2 is a block diagram illustrating a storage device according to an example embodiment of the inventive concept.

FIG. 2 is a block diagram illustrating a storage device according to an example embodiment of the inventive concept.

Referring to FIG. 2, the storage device 100 may include the key-value manager 120, the data buffer 130, and the non-volatile memory 140. The key-value manager 120 may include a key-value extractor 121, a compaction module 122, and a garbage collection module 123. The key-value extractor 121 may extract the key KEY and the value VALUE included in the command CMD. The key-value extractor 121 may store the extracted key KEY in a key buffer 131 of the data buffer 130 and may store the extracted value VALUE in a value buffer 132 of the data buffer 130. In one embodiment, the key buffer 131 and the value buffer 132 may be respectively configured as separate memory devices. In another embodiment, the key buffer 131 and the value buffer 132 may be respectively configured as different areas of the data buffer 130.

In one embodiment, the key-value extractor 121 may manage a physical address of the key KEY stored in the key buffer 131 by using a mapping table, and in one example, the mapping table may be generated as a hash table, which stores, together with the key KEY, a hashed key corresponding to the key KEY as a mapping index for the key KEY.

When the plurality of keys KEY stored in the key buffer 131 have a certain amount of data or more, the key-value extractor 121 may generate a key stream ST_KEY based on the plurality of keys KEY. In one embodiment, the key-value extractor 121 may generate the key stream ST_KEY by consecutively arranging the plurality of keys KEY. In another embodiment, the key-value extractor 121 may generate the key stream ST_KEY by merging the plurality of keys KEY with indices for values VALUE respectively corresponding to the plurality of keys KEY. The key-value extractor 121 may store the generated key stream ST_KEY in a first area AR1 of the non-volatile memory 140.

In one embodiment, the key-value extractor 121 may manage a physical address of a stored key KEY in the first area AR1 by using a hash table. For example, the hash table may store, together with the key KEY, a hashed key corresponding to the key KEY as a mapping index for the key KEY.

When the plurality of values VALUE stored in the value buffer 132 have a certain amount of data or more, the key-value extractor 121 may generate a value stream ST_VAL based on the plurality of values VALUE. In one example, the key-value extractor 121 may generate the value stream ST_VAL by consecutively arranging the plurality of values VALUE. The key-value extractor 121 may store the generated value stream ST_VAL in a second area AR2 of the non-volatile memory 140. In one embodiment, the key-value extractor 121 may manage a physical address of a stored value VALUE in the second area AR2 by using a value table.

The compaction module 122 may perform a compaction operation on at least one key stream ST_KEY stored in the first area AR1. Herein, the compaction operation may refer to an operation of generating a new key stream ST_KEY by deleting the key KEY corresponding to invalid value (e.g., stale value) VALUE stored in the non-volatile memory 140.

In one example, the compaction operation may refer to an operation of merging data, in a data structure that is based on a log structured merge (LSM) tree.

The compaction module 122 may read at least one key stream ST_KEY stored in the first area AR1 and may determine an invalid key (e.g, stale key). In one example, the invalid key may be a key KEY corresponding to a value VALUE to which a delete command is issued by a host. The compaction module 122 may generate a new key stream ST_KEY by using only valid keys KEY included in the at least one key stream ST_KEY. The compaction module 122 may write the generated new key stream ST_KEY to the first area AR1 of the non-volatile memory 140.

According to one embodiment of the inventive concept, when the compaction operation is performed, the storage device 100 may perform the compaction operation by reading only the key stream ST_KEY instead of reading the values VALUE having a relatively large amount of data, and thus, an amount of data access to the non-volatile memory 140 may be reduced.

The compaction module 122 may update the validity of the value VALUE corresponding to the invalid key KEY that is a target of the compaction operation. In one embodiment, the value table including information about a physical address of the non-volatile memory 140, at which the value VALUE is stored, may further include a validity bit indicating validity information about the value VALUE, and the compaction module 122 may update the validity bit of the invalid value VALUE. This will be described below with reference to FIGS. 9A and 9B.

The garbage collection module 123 may perform garbage collection on the non-volatile memory 140. According to one embodiment of the inventive concept, the hash table may include information about the validity of the key stream ST_KEY, and the garbage collection module 123 may perform garbage collection on the key stream ST_KEY based on the hash table. In addition, the value table may include information about the validity of the value stream ST_VAL, and the garbage collection module 123 may perform garbage collection on the value stream ST_VAL based on the value table.

Figure 3:
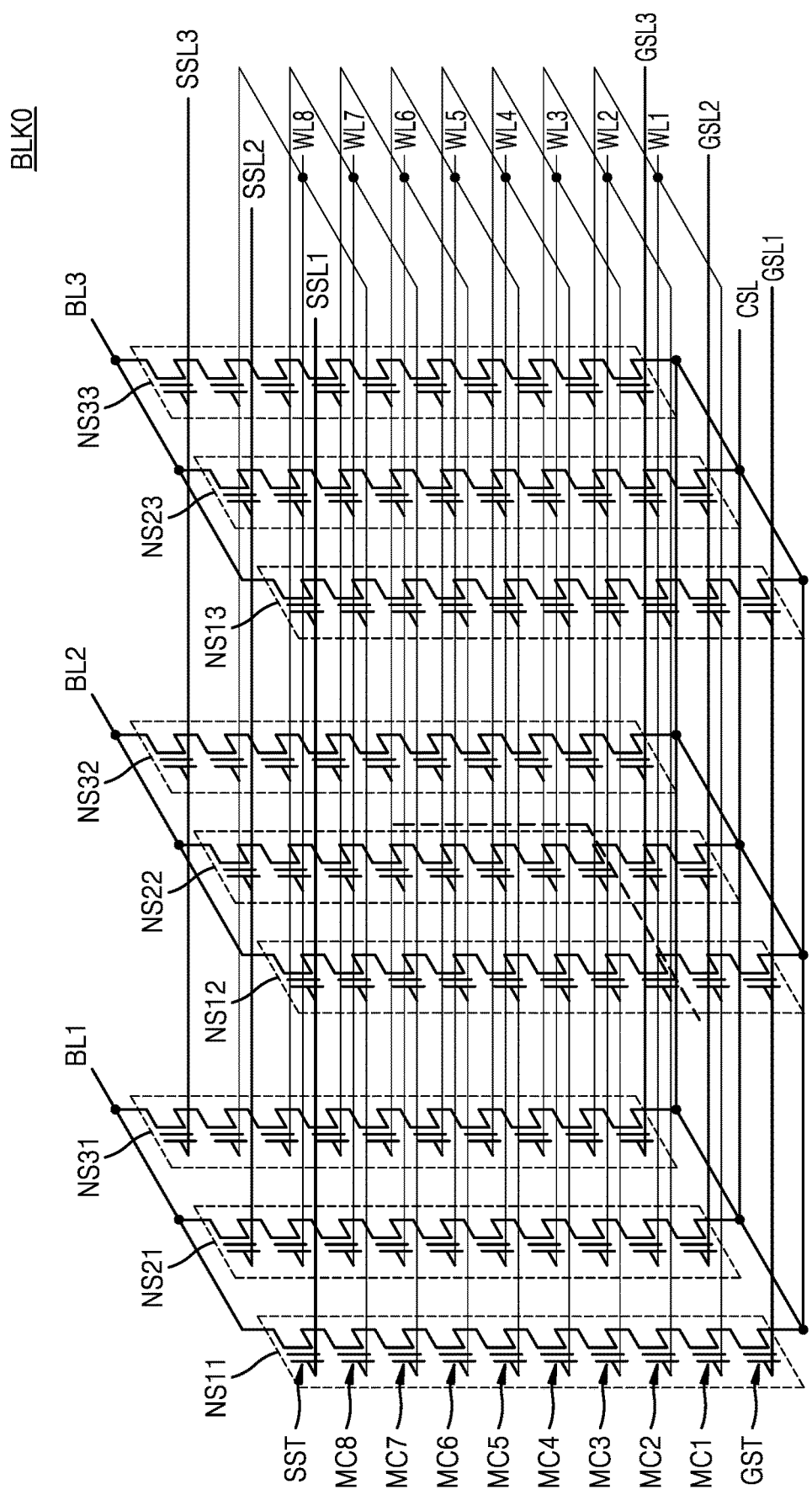
FIG. 3 is a circuit diagram illustrating a memory block included in a memory cell array, according to an example embodiment of the inventive concept.

FIG. 3 is a circuit diagram illustrating a memory block included in a memory cell array, according to an example embodiment of the inventive concept.

Referring to FIG. 3, a memory cell array (for example, MCA of FIG. 1) may be a memory cell array of vertical NAND flash memory and may include a plurality of memory blocks. Each memory block BLK0 may include a plurality of NAND cell strings NS11 to NS33, a plurality of word lines WL1 to WL8, a plurality of bit lines BL1 to BL3, a plurality of ground select lines GSL1 to GSL3, a plurality of cell string select lines SSL1 to SSL3, and a common source line CSL. Here, the number of NAND cell strings, the number of word lines, the number of bit lines, the number of ground select lines, and the number of cell string select lines may variously vary depending upon embodiments.

The NAND cell strings NS11, NS21, and NS31 are arranged between a first bit line BL1 and the common source line CSL, the NAND cell strings NS12, NS22, and NS32 are arranged between a second bit line BL2 and the common source line CSL, and the NAND cell strings NS13, NS23, and NS33 are arranged between a third bit line BL3 and the common source line CSL. Each NAND cell string (for example, NS11) may include a cell string select transistor SST, a plurality of memory cells MC1 to MC8, and a ground select transistor GST, which are connected in series.

NAND cell strings commonly connected to one bit line constitute one column. For example, the NAND cell strings NS11, NS21, and NS31 commonly connected to the first bit line BL1 may correspond to a first column, the NAND cell strings NS12, NS22, and NS32 commonly connected to the second bit line BL2 may correspond to a second column, and the NAND cell strings NS13, NS23, and NS33 commonly connected to the third bit line BL3 may correspond to a third column.

NAND cell strings connected to one cell string select line constitute one row. For example, the NAND cell strings NS11, NS12, and NS13 connected to a first cell string select line SSL1 may correspond to a first row, the NAND cell strings NS21, NS22, and NS23 connected to a second cell string select line SSL2 may correspond to a second row, and the NAND cell strings NS31, NS32, and NS33 connected to a third cell string select line SSL3 may correspond to a third row.

Cell string select transistors SST are respectively connected to the corresponding cell string select lines SSL1 to SSL3. The plurality of memory cells MC1 to MC8 are respectively connected to the corresponding word lines WL1 to WL8. Ground select transistors GST are respectively connected to the corresponding ground select lines GSL1 to GSL3. Cell string select transistors SST are connected to the corresponding bit lines BL1 to BL3, and the ground select transistor GST is connected to the common source line CSL.

Word lines (for example, WL1) at the same height are commonly connected to each other, the cell string select lines SSL1 to SSL3 are separated from each other, and the ground select lines GSL1 to GSL3 are also separated from each other. For example, when memory cells connected to a first word line WL1 and included in the NAND cell strings NS11, NS12, and NS13 are programmed, the first word line WL1 and the first cell string select line SSL1 are selected. The ground select lines GSL1 to GSL3 may be commonly connected to each other.

A storage device according to one embodiment of the inventive concept may respectively store a key and a value in different areas of a memory cell array. In one example, the key may be stored at a first page connected to the first word line WL1 of the memory block BLK0, and the value may be stored at a second page connected to a fourth word line WL4 of the memory block BLK0.

Figure 4:
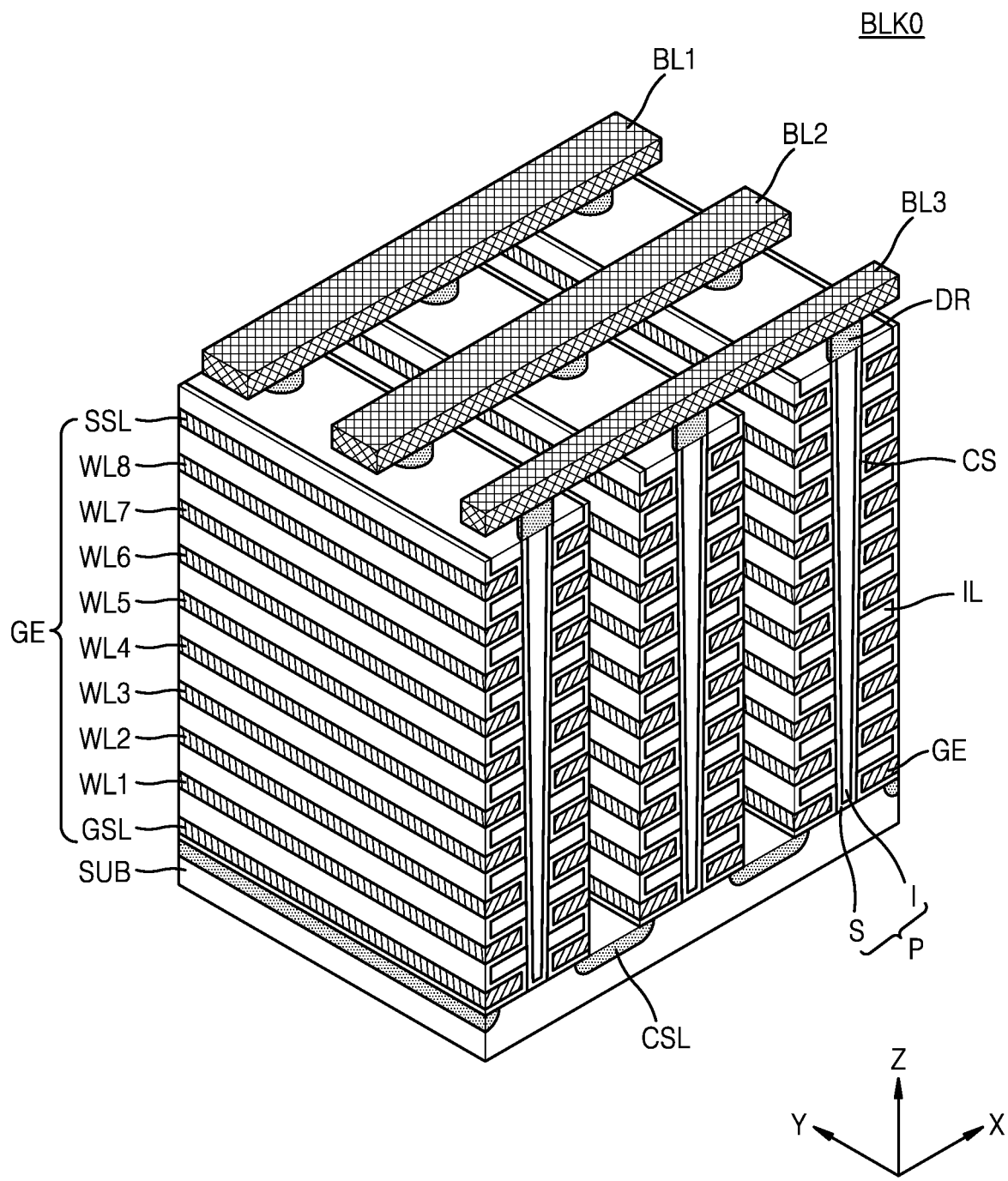
FIG. 4 is a perspective view illustrating the memory block of FIG. 3.

FIG. 4 is a perspective view illustrating the memory block of FIG. 3.

Referring to FIG. 4, each memory block included in a memory cell array (for example, MCA of FIG. 1) is formed in a vertical direction with respect to a substrate SUB. Although FIG. 4 illustrates that a memory block includes two select lines GSL and SSL, eight word lines WL1 to WL8, and three bit lines BL1 to BL3, the number of each of the components included in the memory block may be actually greater or less than that set forth above.

The substrate SUB is of a first conductivity type (for example, p-type), and the common source line CSL, which extends in a first direction (for example, a Y direction) and is doped with impurities of a second conductivity type (for example, n-type), is arranged on the substrate SUB. Over a region of the substrate SUB between two adjacent common source lines CSL, a plurality of insulating films IL extending in the first direction are sequentially arranged in a third direction (for example, a Z direction), and the plurality of insulating films IL are apart from each other in the third direction by as much as a specific distance. For example, each of the plurality of insulating films IL may include an insulating material such as silicon oxide.

On the region of the substrate SUB between the two adjacent common source lines CSL, a plurality of pillars P, each penetrating the plurality of insulating films IL in the third direction, are sequentially arranged in the first direction. For example, the plurality of pillars P may contact the substrate SUB through the plurality of insulating films IL. Specifically, a surface layer S of each pillar P may include a silicon material of a first conductivity type and may function as a channel region. In addition, an inner layer I of each pillar P may include an insulating material, such as silicon oxide, or an air gap.

In a region between the two adjacent common source lines CSL, a charge storage layer CS is arranged along exposed surfaces of the insulating films IL, the pillars P, and the substrate SUB. The charge storage layer CS may include a gate insulating layer (otherwise referred to as the term "tunneling insulating layer"), a charge trap layer, and a blocking insulating layer. For example, the charge storage layer CS may have an oxide-nitride-oxide (ONO) structure. In addition, in the region between the two adjacent common source lines CSL, gate electrodes GE, such as the select lines GSL and SSL and the word lines WL1 to WL8, are arranged on exposed surfaces of the charge storage layer CS.

Drains or drain contacts DR are respectively arranged on the plurality of pillars P. For example, the drains or drain contacts DR may include a silicon material doped with impurities of a second conductivity type. The bit lines BL1 to BL3, which extend in a second direction (for example, an X direction), may be arranged on the drains DR to be apart from each other by as much as a specific distance in the first direction.

Figure 5:
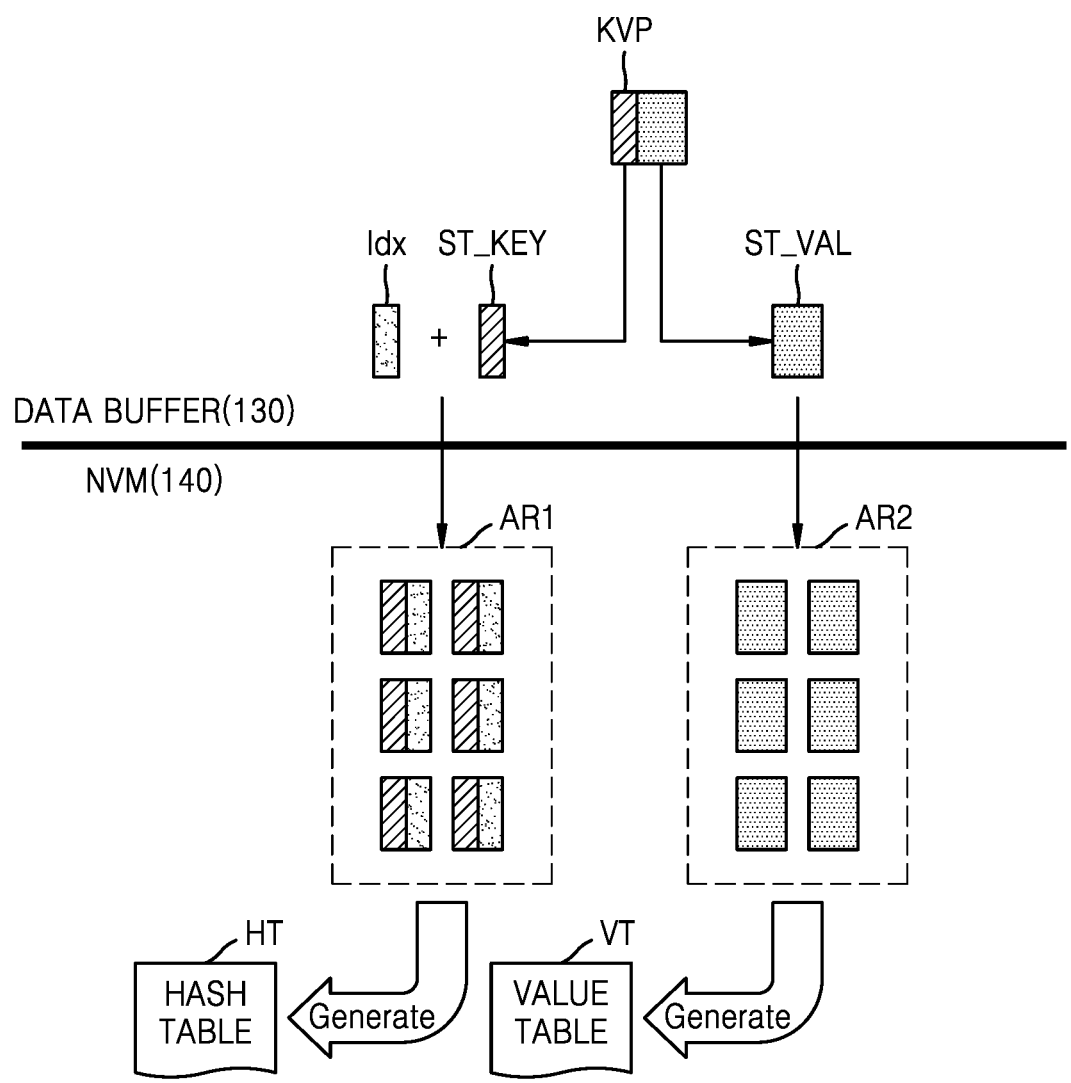
FIG. 5 is a conceptual diagram illustrating operations of a storage device, according to an example embodiment of the inventive concept.

FIG. 5 is a conceptual diagram illustrating operations of a storage device, according to an example embodiment of the inventive concept.

Referring to FIGS. 2 and 5, the key-value manager 120 may receive key-value pairs KVP and may separate, from each other, keys and values, both included in the key-value pairs KVP. The key-value manager 120 may couple a key to an index Idx corresponding to each value and may store, in the data buffer 130, the key coupled to the index Idx. In addition, the key-value manager 120 may generate the key stream ST_KEY by merging the plurality of keys KEY, each coupled to the index Idx, and may store the generated key stream ST_KEY in the first area AR1 of the non-volatile memory 140.

Although FIG. 5 illustrates that one key stream ST_KEY corresponds to one index Idx, this is merely for descriptive convenience, and the key stream ST_KEY according to one embodiment of the inventive concept may include a plurality of index-key pairs, in which indices Idx are respectively coupled to keys.

The key-value manager 120 may generate a hash table HT by using a physical page number (PPN) at which the key stream ST_KEY is stored in the first area AR1 of the non-volatile memory 140. For example, the hash table HT may store index of a Sorted String Table (SS table) that comprises a key of the key stream ST_KEY and a physical address of the non-volatile memory 140, at which the key of key stream ST_KEY is stored. The SS table may be a data file that comprises the key-value pairs KVP, and hash table HT may store file name of SS table and physical address at which the key of SS table is stored.

The key-value manager 120 may store, in the data buffer 130, the values separated from the key-value pairs KVP, may generate the value stream ST_VAL by merging a plurality of values stored in the data buffer 130, and may store the generated value stream ST_VAL in the second area AR2 of the non-volatile memory 140.

The key-value manager 12 may generate a value table VT by using a PPN at which the value stream ST_VAL is stored in the non-volatile memory 140. For example, the value table VT may store the value stream ST_VAL and a physical address of the non-volatile memory 140, at which the value stream ST_VAL is stored. In one embodiment, the value table VT may further include a validity bit indicating whether the value VALUE is valid or not.

Figure 6:
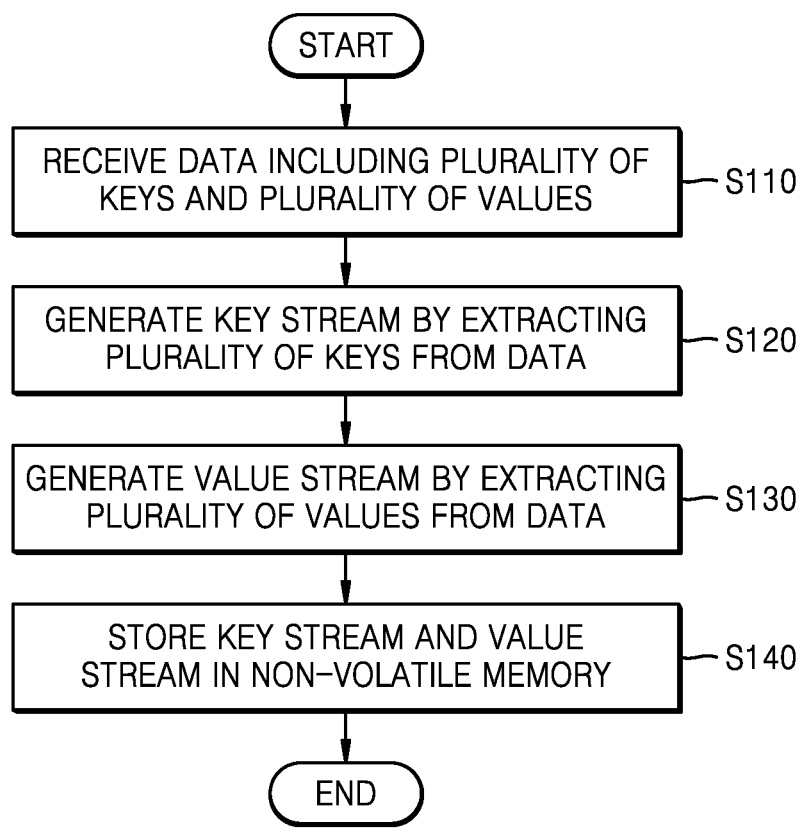
FIG. 6 is a flowchart illustrating an operating method of a key-value manager, according to an example embodiment of the inventive concept.

FIG. 6 is a flowchart illustrating an operating method of a key-value manager, according to an example embodiment of the inventive concept.

Referring to FIGS. 2 and 6, the key-value manager 120 may receive data including the plurality of keys KEY and the plurality of values VALUE (S110), and may generate the key stream ST_KEY by extracting the plurality of keys KEY from the received data (S120). In addition, the key-value manager 120 may generate the value stream ST_VAL by extracting the plurality of values VALUE from the received data (S130). The key-value manager 120 may store the generated key stream ST_KEY and the generated value stream ST_VAL in the non-volatile memory 140 (S140). For example, the generated key stream ST_KEY may be stored in the first area AR1 of the non-volatile memory 140, and the generated value stream ST_VAL may be stored in the second area AR2 of the non-volatile memory 140.

According to one embodiment of the inventive concept, the key-value manager 120 may store the keys KEY and the values VALUE in the non-volatile memory 140 separately from each other and may efficiently manage data by managing separately the keys KEY and the values VALUE.

Figure 7:
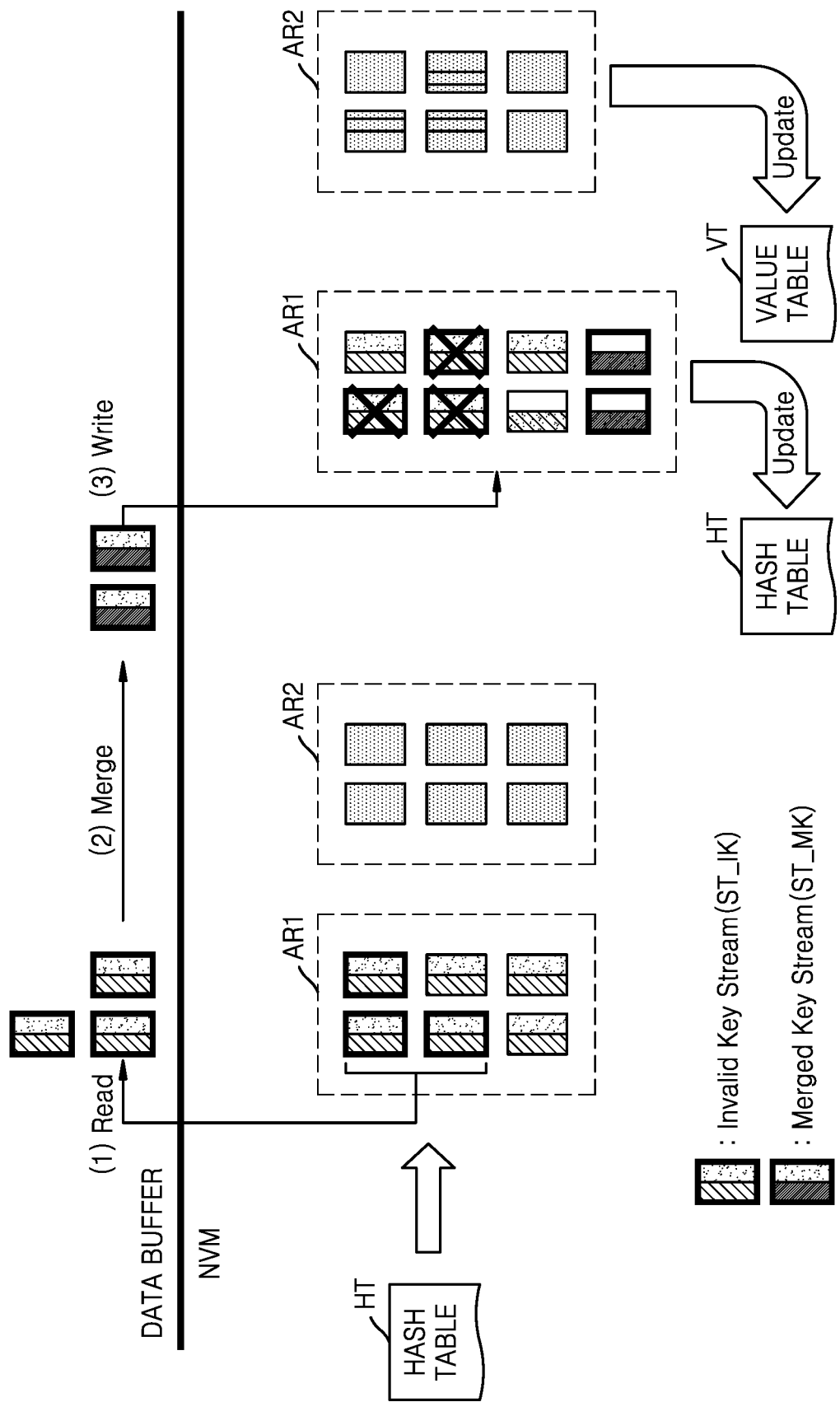
FIG. 7 is a conceptual diagram illustrating operations of a key-value manager, according to an example embodiment of the inventive concept.

FIG. 7 is a conceptual diagram illustrating operations of a key-value manager, according to an example embodiment of the inventive concept. In particular, FIG. 7 is a diagram illustrating a method in which a key-value manager performs a compaction operation.

Referring to FIGS. 2 and 7, the key-value manager 120 may read invalid key streams ST_IK from the first area AR1 of the non-volatile memory 140. In one embodiment, the key-value manager 120 may update, in response to various commands of the host 200 (FIG. 1), a hash table HT with information regarding whether keys included in a key stream are valid or not, and may determine the invalid key streams ST_IK based on the hash table HT. In one example, when receiving an erase command for a first value from the host 200 (FIG. 1), the key-value manager 120 may update the hash table HT with a first key corresponding to the first value such that the first key may be identified based on an index coupled thereto and be indicated as being invalid.

The key-value manager 120 may generate at least one merged key stream ST_MK by merging the invalid key streams ST_IK. In one example, the key-value manager 120 may generate the merged key stream ST_MK by, based on the hash table HT, deleting invalid keys and extracting only valid keys. Thus, the merged key stream ST_MK may be a key stream in which only the valid keys are included.

The key-value manager 120 may write the generated merged key stream ST_MK to the first area AR1 of the non-volatile memory 140. The key-value manager 120 may update the value table VT by using invalid values corresponding to invalid keys. In one embodiment, the key-value manager 120 may update the value table VT by converting validity bits corresponding to the invalid values of the value table VT.

In one embodiment, the key-value manager 120 may perform garbage collection on the invalid values, based on the validity bits of the value table VT. As the garbage collection is performed based on the value table VT, the invalid values may be deleted from the second area AR2. This will be described below with reference to FIGS. 9A and 9B.

When performing a compaction operation, the key-value manager 120 according to one embodiment of the inventive concept may perform merging on invalid keys and values by reading and re-writing keys having a relatively small amount of data instead of performing data input/output of values having a relatively large amount of data. For example, the compaction operation may be performed without input/output of an excessive amount of data, and thus, and a data processing speed may be increased.

Figure 8:
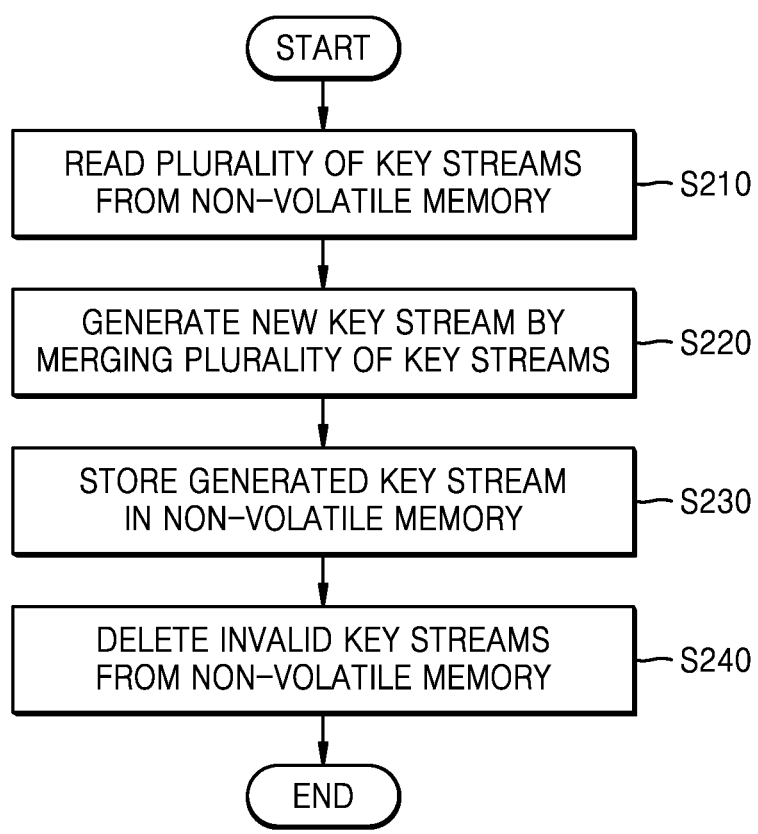
FIG. 8 is a flowchart illustrating an operating method of a key-value manager, according to an example embodiment of the inventive concept.

FIG. 8 is a flowchart illustrating an operating method of a key-value manager, according to an example embodiment of the inventive concept. In particular, FIG. 8 illustrates a method of operating a key-value manager such that the key-value manager performs a compaction operation.

Referring to FIGS. 2 and 8, the key-value manager 120 may read a plurality of key streams from the non-volatile memory 140 (S210). In one embodiment, the plurality of key streams read from the non-volatile memory may include at least one invalid key. The key-value manager 120 may generate a new key stream by merging the plurality of key streams (S220). In one example, the key-value manager 120 may generate the new key stream by removing invalid keys included in the plurality of key streams and merging only valid keys therein.

The key-value manager 120 may store the generated key stream in the non-volatile memory 140 (S230). The key-value manager 120 may delete invalid key streams from the non-volatile memory 140 (S240). In one embodiment, the key-value manager 120 may update a value table to indicate validity bits corresponding to the invalid value streams as being invalid, and may delete the invalid value streams by performing garbage collection on the invalid value streams.

Figures 9A, 9B:
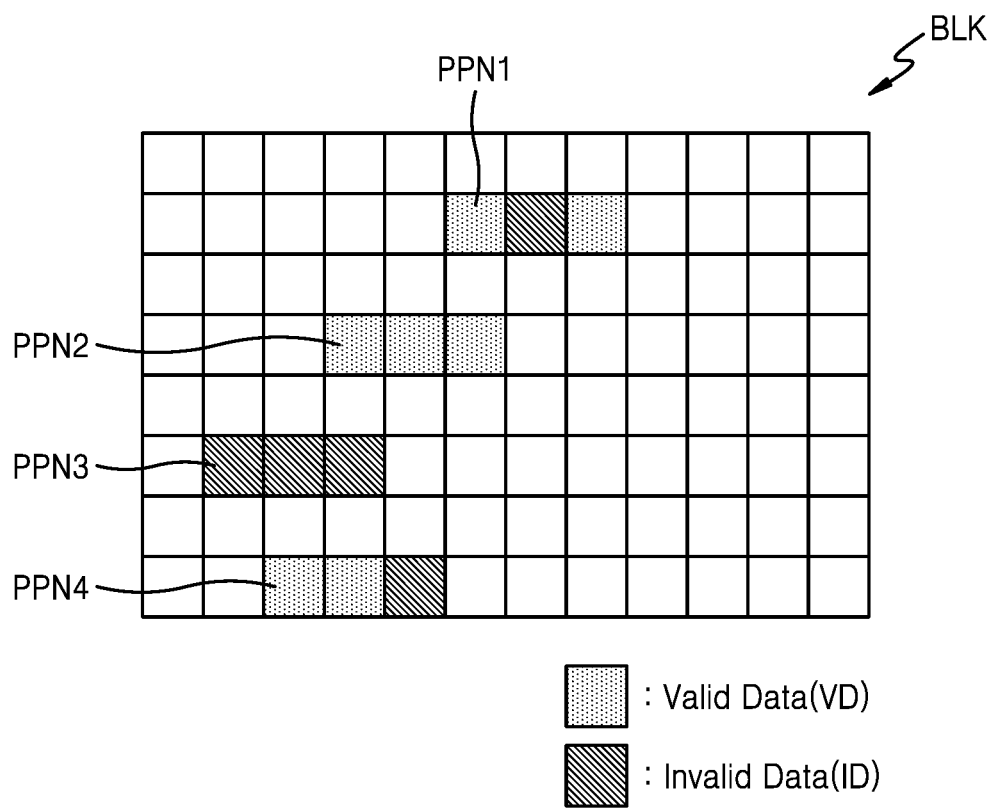
FIG. 9A is a diagram illustrating a block according to an example embodiment of the inventive concept.
FIG. 9B is a diagram illustrating a multi-map table according to an example embodiment of the inventive concept.

FIG. 9A is a diagram illustrating a block according to an example embodiment of the inventive concept, and FIG. 9B is a diagram illustrating a multi-map table according to an example embodiment of the inventive concept. In one example, a multi-map table MIVIT of FIG. 9B may represent the hash table or the value table, which has been described with reference to FIGS. 1 to 8.

Referring to FIG. 9A, a block BLK may include a plurality of memory cells (marked by quadrangles in FIG. 9A) respectively having different PPNs, and each of the plurality of memory cells may have valid data VD or invalid data ID stored therein. In one embodiment, the valid data VD or the invalid data ID may include a key of a key stream or a value of a value stream described with reference to FIGS. 1 to 8. Either of the key stream or the value stream may be referred to as a data stream. In addition, the valid data VD may refer to a value, against which a delete command is not issued by the host 200 (FIG. 1), or a key corresponding thereto, and the invalid data ID may refer to a value, against which a delete command is issued by the host 200, or a key corresponding thereto.

The block BLK may store a plurality of pieces (i.e., pages) of data, and at least some of the pieces of data may be consecutively written to the block BLK. In the example of FIG. 9A, three pieces of data may be consecutively written to a first address PPN1, three pieces of data may be consecutively written to a second address PPN2, three pieces of data may be consecutively written to a third address PPN3, and three pieces of data may be consecutively written to a fourth address PPN4.

Referring to FIG. 9B, the pieces of data written in FIG. 9A may be identified in terms of storage locations thereof by using a multi-map table MIVIT. The multi-map table MMT may include an address (for example, a PPN) at which the first piece (i.e., a head piece or a head page) of data among consecutive pieces of data is stored, and validity bits VD1 to VD3 indicating the validity or not of the consecutive pieces of data stored at the address set forth above. In one example, each of the validity bits VD1 to VD3 may include '1' when data corresponding thereto is valid, and may include '0' when the data corresponding thereto is invalid.

Referring again to FIGS. 9A and 9B, because the consecutive pieces of data stored at the first address PPN1 may be respectively and sequentially a piece of valid data VD, a piece of invalid data ID, and a piece of valid data VD, the multi-map table MMT may include '1', '0', and '1', in this stated order, as the validity bits VD1 to VD3 corresponding to the first address PPN1. Because all the consecutive pieces of data stored at the second address PPN2 may be pieces of valid data VD, the multi-map table MMT may include all Ts as the validity bits VD1 to VD3 corresponding to the second address PPN2.

Because all the consecutive pieces of data stored at the third address PPN3 may be pieces of invalid data ID, the multi-map table MMT may include all '0's as the validity bits VD1 to VD3 corresponding to the third address PPN3. Because the consecutive pieces of data stored at the fourth address PPN4 may be respectively and sequentially a piece of valid data VD, a piece of valid data VD, and a piece of invalid data ID, the multi-map table MMT may include '1', '1', and '0', in this stated order, as the validity bits VD1 to VD3 corresponding to the fourth address PPN4.

In one embodiment, the key-value manager 120 (FIG. 2) may perform garbage collection by using the multi-map table MMT. For example, the key-value manager 120 may determine which data (for example, which key stream or which value stream) is valid by using the multi-map table MMT, and may secure a valid space of the non-volatile memory 140 (FIG. 2) by performing garbage collection on invalid data.

Figure 10:
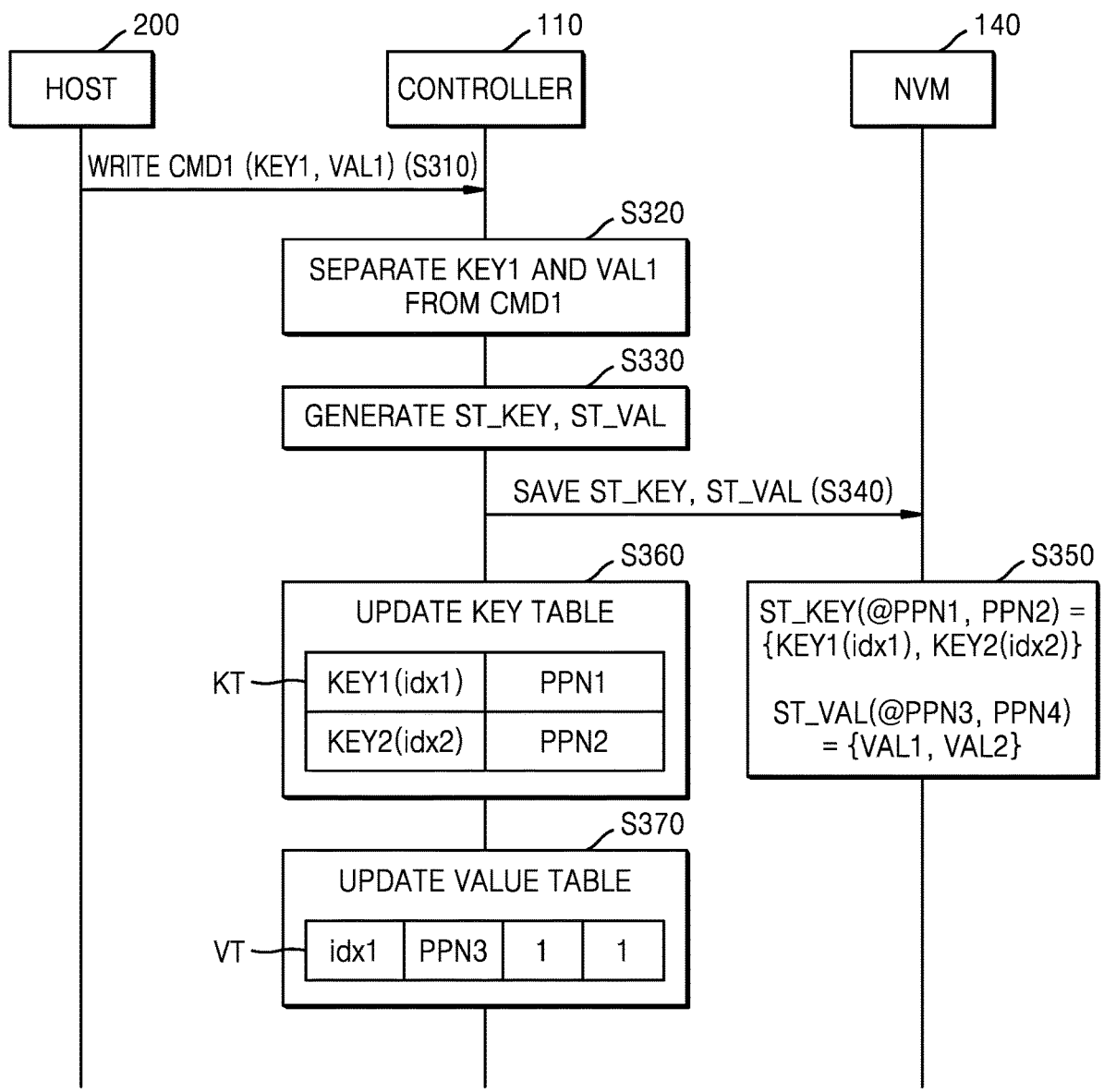
FIG. 10 is a diagram illustrating operations of a storage system over time, according to an example embodiment of the inventive concept.

FIG. 10 is a diagram illustrating operations of a storage system over time, according to an example embodiment of the inventive concept. In particular, FIG. 10 is a diagram illustrating an embodiment in which the storage system receives a write command.

Referring to FIG. 10, the storage system may include the host 200, the controller 110, and the non-volatile memory 140. The host 200 may output, to the controller 110, a first command CMD1 for writing a first key KEY1 and a first value VAL1 (S310). The controller 110 may separate the first key KEY1 and the first value VAL1 from the first command CMD1 (S320).

The controller 110 may generate the key stream ST_KEY by using the first key KEY1 and a second key KEY2 previously stored in the data buffer 130 (FIG. 2), and may generate the value stream ST_VAL by using the first value VAL1 and a second value VAL2 previously stored in the data buffer 130 (FIG. 2) (S330). In one embodiment, the controller 110 may merge the first key KEY1 with a first index idx1 corresponding to the first value VAL1, may merge the second key KEY2 with a second index idx2 corresponding to the second value VAL2, and may merge, with each other, the first key KEY1 and the second key KEY2, each having undergone index merging, thereby generating the key stream ST_KEY.

The non-volatile memory 140 may store the first key KEY1 at the first address PPN1 and may store the second key KEY2 at the second address PPN2 (S350). In addition, the non-volatile memory 140 may store the first value VAL1 at the third address PPN3 and may store the second value VAL2 at the fourth address PPN4 (S350). In one embodiment, the first address PPN1 and the second address PPN2 may be physically consecutive to each other, and the third address PPN3 and the fourth address PPN4 may be physically consecutive to each other. In addition, both the first address PPN1 and the second address PPN2 may be located in different areas from both the third address PPN3 and the fourth address PPN4.

The controller 110 may cause, in the key table KT, a storage location of the first key KEY1 to correspond to the first address PPN1 and may cause, in the key table KT, a storage location of the second key KEY2 to correspond to the second address PPN2, thereby updating the key table KT (S360).

The controller 110 may write the third address PPN3 to the value table VT such that the third address PPN3 corresponds to the first index idx1 corresponding to the first value VAL1. In addition, because the first value VAL1 and the second value VAL2 written to consecutive addresses are valid, the controller 110 may update the value table VT by writing both Ts as validity bits corresponding thereto (S370).

The controller 110 according to one embodiment of the inventive concept may not write, to the value table VT, both addresses for the first value VAL1 and the second value VAL2, which are consecutively written, and may write only an address corresponding to the first value, thereby efficiently managing the value table VT. In addition, the controller 110 may cause the value table VT to include the validity bits for the consecutive values VAL1 and VAL2, thereby efficiently managing information regarding whether consecutive pieces of data are valid.

Figure 11:
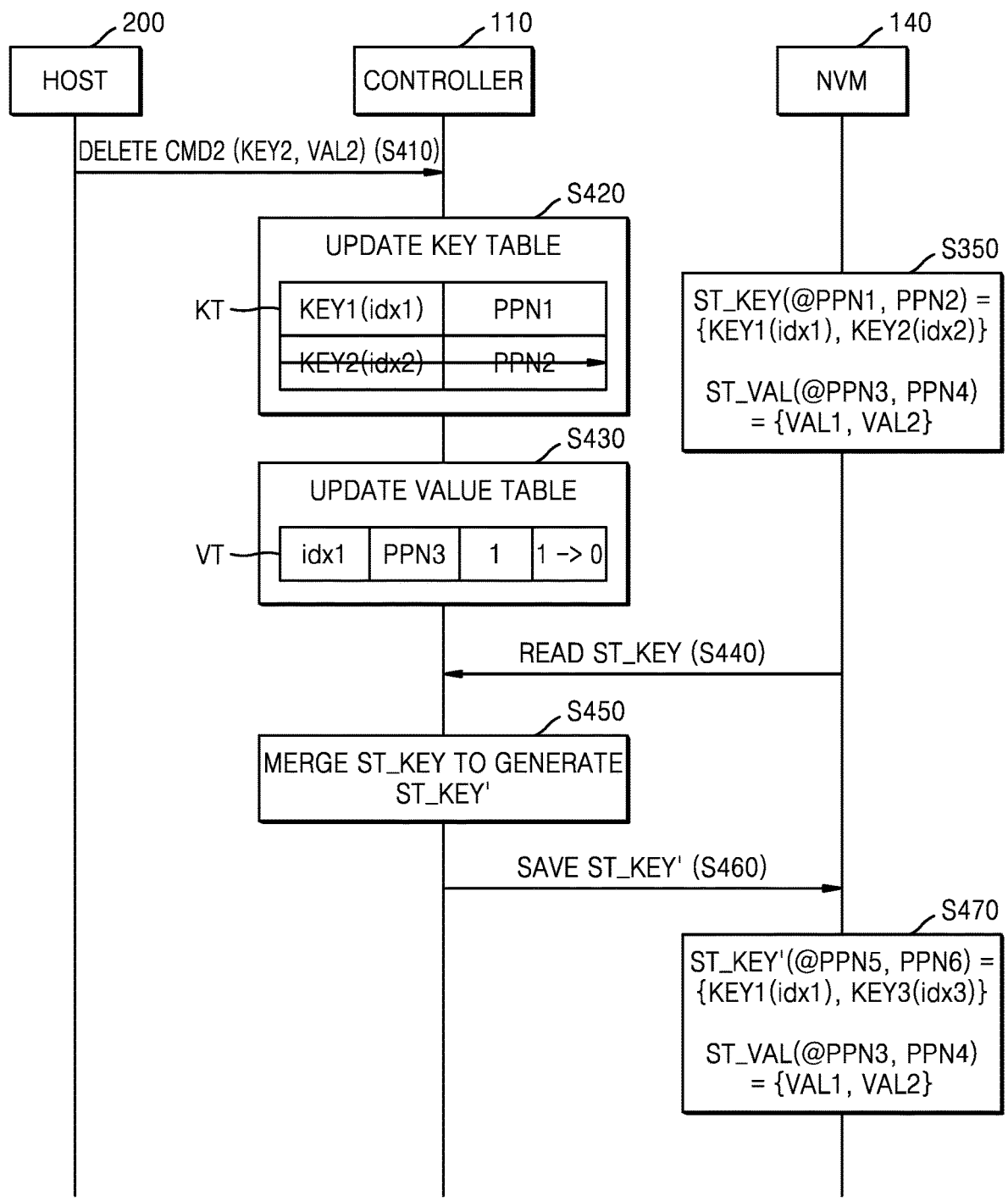
FIG. 11 is a diagram illustrating operations of a storage system over time, according to an example embodiment of the inventive concept.

FIG. 11 is a diagram illustrating operations of a storage system over time, according to an example embodiment of the inventive concept. In particular, FIG. 11 is a diagram illustrating an embodiment in which the storage system receives an erase command.

Referring to FIG. 11, the storage system may include the host 200, the controller 110, and the non-volatile memory 140. The host 200 may output, to the controller 110, a second command CMD2 for erasing the second key KEY2 and the second value VAL2 (S410). The controller 110 may update the key table KT by deleting portions of the key table KT, which correspond to the second key KEY2, in response to the second command CMD2 (S420). The controller 110 may update, from '1' to '0', a second-place validity bit of the value table VT in response to the second command CMD2, the second-place validity bit indicating whether the second value VAL2 is valid or not (S430).

To perform a compaction operation, the controller 110 may read the key stream ST_KEY from the non-volatile memory 140 (S440). The controller 110 may generate a merged key stream ST_KEY' by merging the key stream ST_KEY with a separate key stream (S450). In one example, the controller 110 may delete the second key KEY2 in response to the second command CMD2, and may generate the merged key stream ST_KEY' by using both the first key KEY1 included in the key stream ST_KEY and a third key KEY3 included in the separate key stream.

The controller 110 may store the merged key stream ST_KEY' in the non-volatile memory 140 (S460), and the non-volatile memory 140 may store the merged key stream ST_KEY' at a fifth address PPN5 and a sixth address PPN6 (S470). According to one embodiment of the inventive concept, in the compaction operation, the controller 110 may read only the key stream ST_KEY having a relatively small amount of data from the non-volatile memory 140 instead of reading the value stream ST_VAL having a relatively large amount of data from the non-volatile memory 140, and may write the merged key stream ST_KEY' to the non-volatile memory 140. Therefore, an amount of data input/output with respect to the non-volatile memory 140, for performing the compaction operation, may be reduced.

Figure 12:
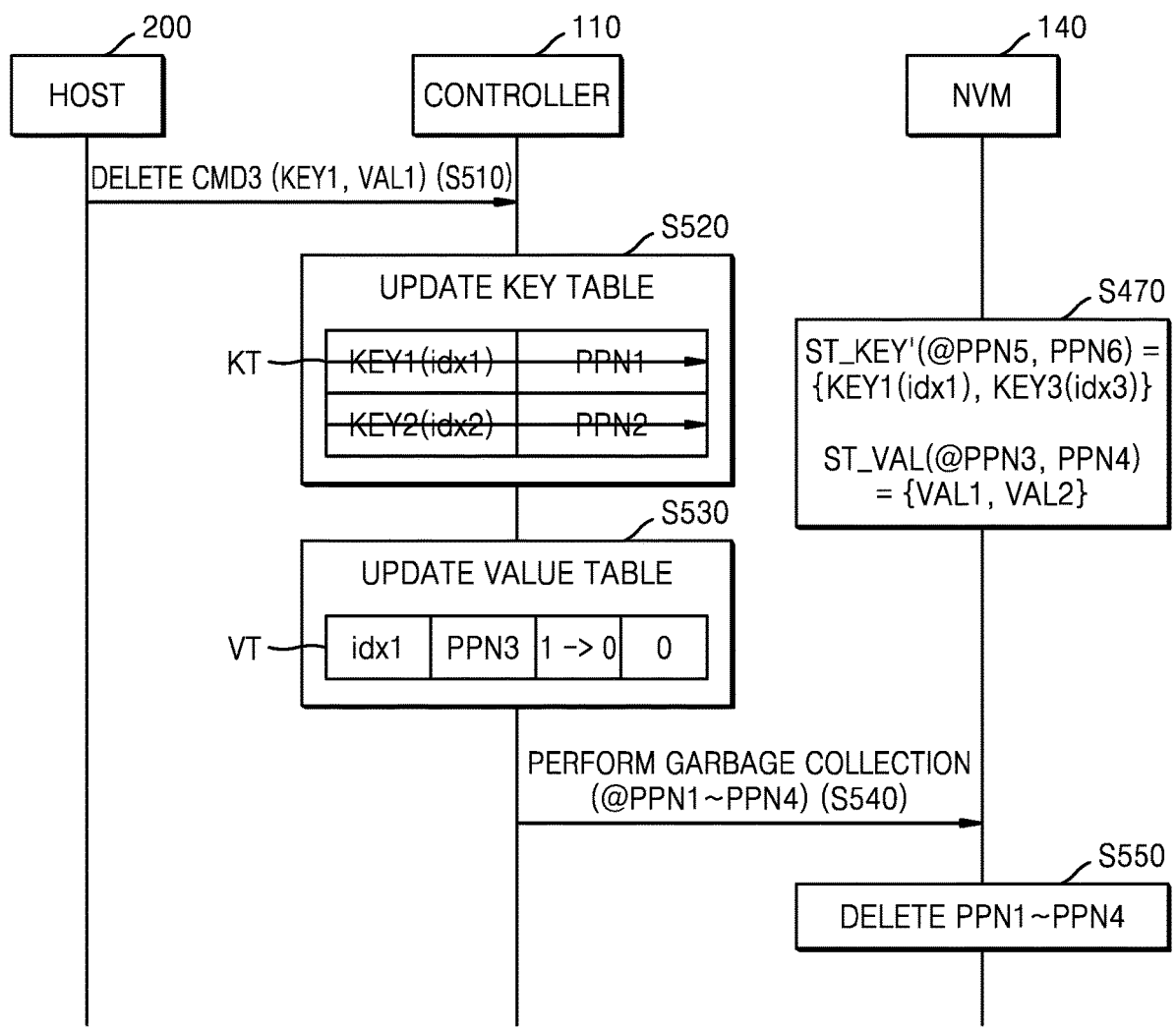
FIG. 12 is a diagram illustrating operations of a storage system over time, according to an example embodiment of the inventive concept.

FIG. 12 is a diagram illustrating operations of a storage system over time, according to an example embodiment of the inventive concept. In particular, FIG. 12 is a diagram illustrating an embodiment in which the storage system performs garbage collection.

Referring to FIG. 12, the storage system may include the host 200, the controller 110, and the non-volatile memory 140. The host 200 may output, to the controller 110, a third command CMD3 for erasing the first key KEY1 and the first value VAL1 (S510). The controller 110 may update the key table KT by deleting portions of the key table KT, which correspond to the first key KEY1, in response to the third command CMD3 (S520). The controller 110 may update, from '1' to '0', a first-place validity bit of the value table VT in response to the third command CMD3, the first-place validity bit indicating whether the first value VAL1 is valid or not (S530).

Because all validity bits corresponding to the first index idx1 are '0', the controller 110 may perform garbage collection for deleting the corresponding value stream ST_VAL and the corresponding key stream (S540). In response to a garbage collection request of the controller 110, the non-volatile memory 140 may delete the first address PPN1 and the second address PPN2, at which the first key KEY1 and the second key KEY2 are respectively stored, and may delete the third address PPN3 and the fourth address PPN4, at which the first value VAL1 and the second value VAL2 are respectively stored (S550).

Figure 13:
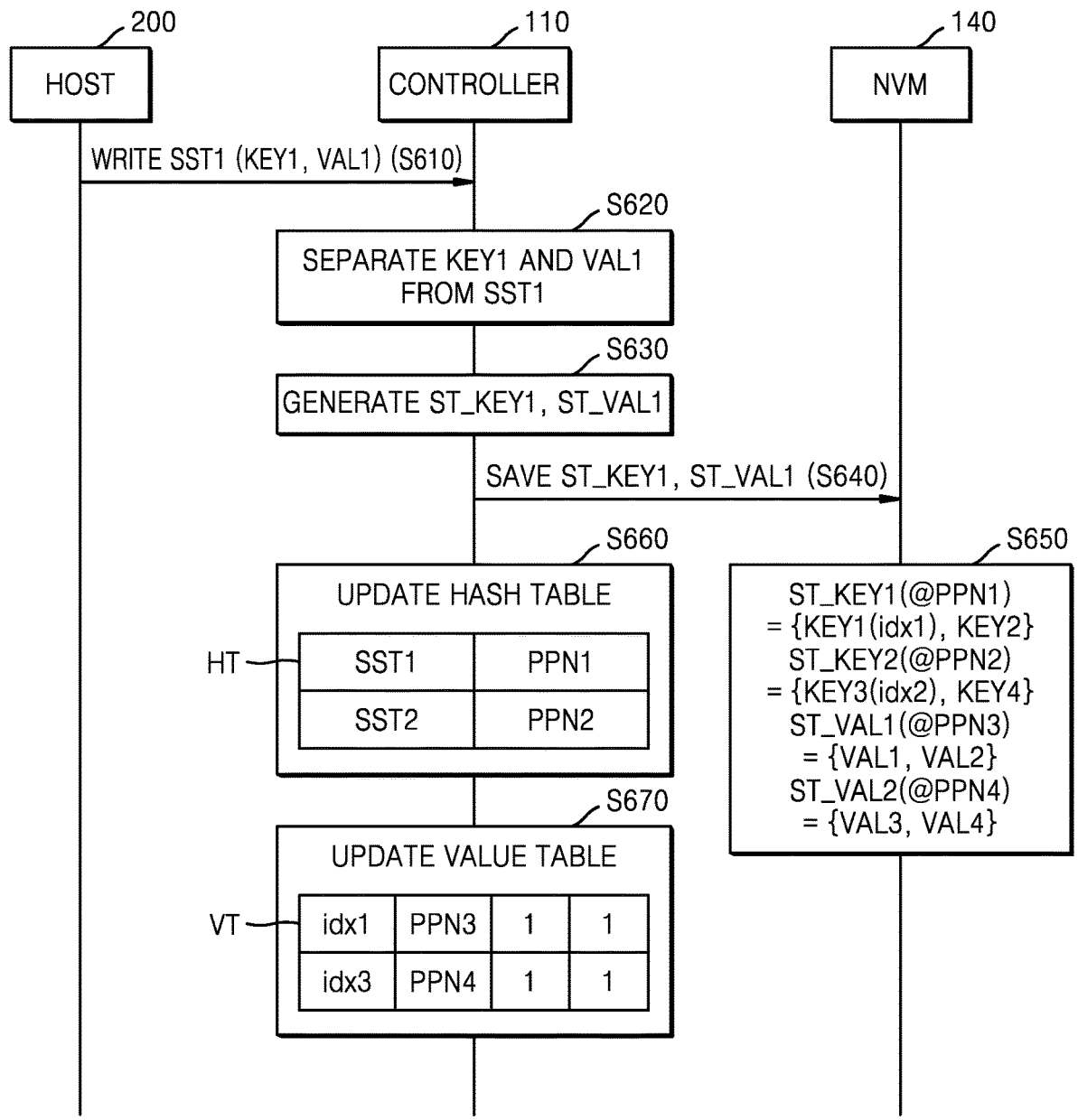
FIG. 13 is a diagram illustrating operations of a storage system over time, according to an example embodiment of the inventive concept.

FIG. 13 is a diagram illustrating operations of a storage system over time, according to an example embodiment of the inventive concept. In particular, FIG. 13 is a diagram illustrating an embodiment in which the storage system receives a write command for writing SS table.

Referring to FIG. 13, the storage system may include the host 200, the controller 110, and the non-volatile memory 140. The host 200 may output, to the controller 110, a first SS table SST1 comprising a first key KEY1 and a first value VAL1 (S610). The controller 110 may separate the first key KEY1 and the first value VAL1 from the first SS table SST1 (S620).

The controller 110 may generate a first key stream ST_KEY1 by using the first key KEY1 and a second key KEY2 previously stored in the data buffer 130 (FIG. 2), and may generate a first value stream ST_VAL1 by using the first value VAL1 and a second value VAL2 previously stored in the data buffer 130 (FIG. 2) (S630).

The non-volatile memory 140 may store the first key KEY1 at the first address PPN1 and may store the second key KEY2 at the next address to the first address PPN1 (S650). In addition, the non-volatile memory 140 may store the first value VAL1 at the third address PPN3 and may store the second value VAL2 at the next address to the third address PPN3 (S650). So that, the non-volatile memory 140 may store the first key stream ST_KEY1 at the first address PPN1 and the first value stream ST_VAL1 at the third address PPN3. Also, the non-volatile memory 140 may already store a second key stream ST_KEY2 at the second address PPN2 and the second value stream ST_VAL2 which is corresponding to the second key stream ST_KEY2 at the fourth address PPN4.

The controller 110 may cause, in the hash table HT, a storage location of the first SS table SST1 to correspond to the first address PPN1 and may cause, in the hash table HT, a storage location of the second SS table SST2 to correspond to the second address PPN2, thereby updating the hash table HT (S660).

The controller 110 may write the third address PPN3 to the value table VT such that the third address PPN3 corresponds to the first index idx1 corresponding to the first value VAL1. In addition, because the first value VAL1 and the second value VAL2 written to consecutive addresses are valid, the controller 110 may update the value table VT by writing both 1s as validity bits corresponding thereto (S670).

Figure 14:
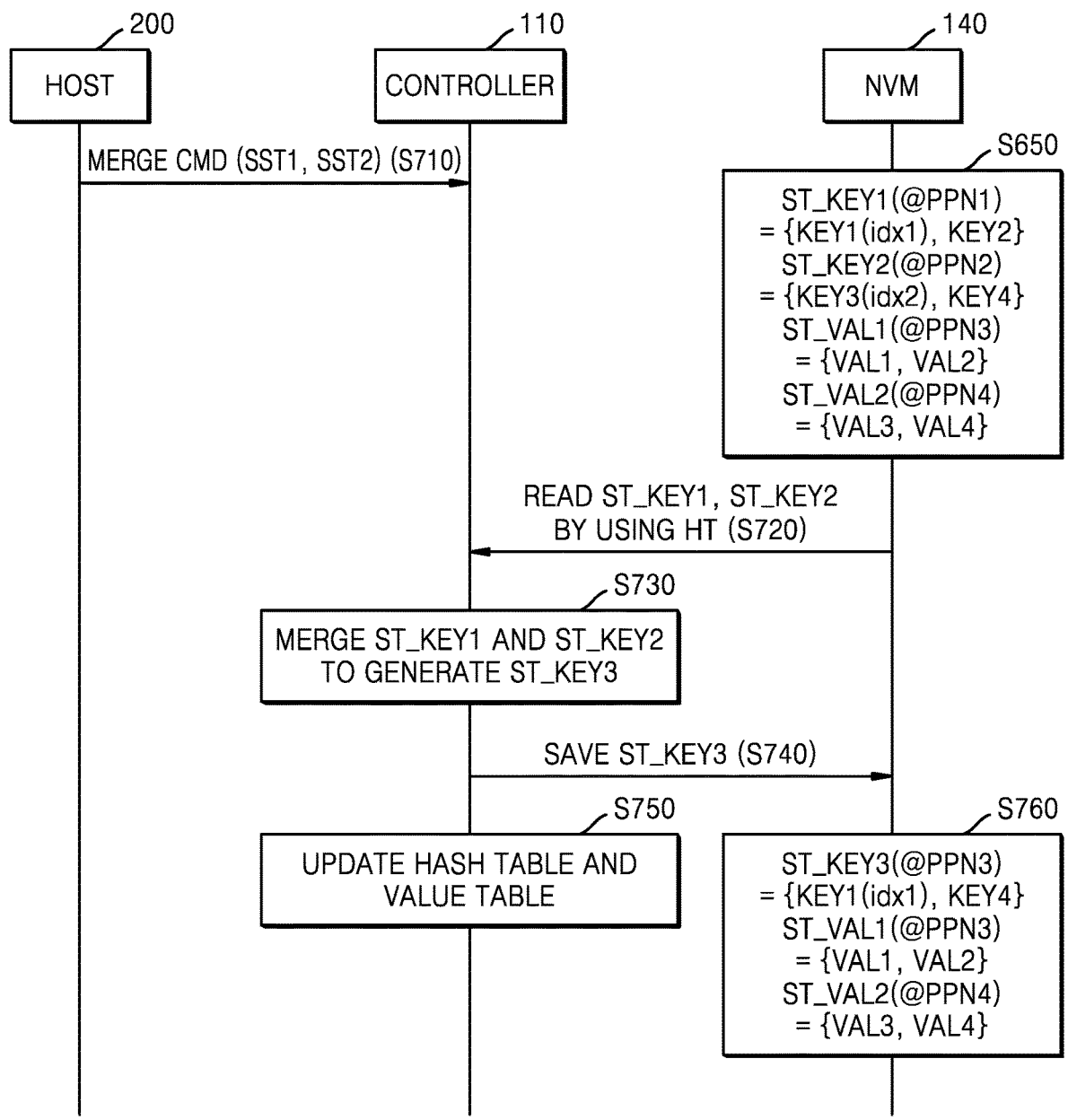
FIG. 14 is a diagram illustrating operations of a storage system over time, according to an example embodiment of the inventive concept.

FIG. 14 is a diagram illustrating operations of a storage system over time, according to an example embodiment of the inventive concept. In particular, FIG. 14 is a diagram illustrating an embodiment in which the storage system receives a merge command.

Referring to FIG. 14, the storage system may include the host 200, the controller 110, and the non-volatile memory 140. The host 200 may output, to the controller 110, a merge command (or a compaction command) for merging the first SS table SST1 and the second SS table SST2 (S710). The controller 110 may read the first key stream ST_KEY1 and the second key stream ST_KEY2 from the non-volatile memory 140 (S720).

The controller 110 may merge the first key stream ST_KEY1 and the second key stream ST_KEY2 to generate a third key stream ST_KEY3 (S730). In one example, the controller 110 may delete the second key KEY2 from the first key stream ST_KEY1 read from the non-volatile memory 140 and the third key KEY3 read from the second key stream ST_KEY2 and may generate the third key stream ST_KEY3 by merging valid keys (e.g., a first key KEY1 of the first key stream ST_KEY1 and a fourth key KEY4 of the second key stream ST_KEY2) in the first key stream ST_KEY1 and the second key stream ST_KEY2.

The controller 110 may store the third key stream ST_KEY3 in the non-volatile memory 140 (S740), and the non-volatile memory 140 may store the third key stream ST_KEY3 at a fifth address PPN5 (S760). According to one embodiment of the inventive concept, in the compaction operation, the controller 110 may read only the key streams ST_KEY1 and ST_KEY2 having a relatively small amount of data from the non-volatile memory 140 instead of reading the value streams ST_VAL1 and ST_VAL2 having a relatively large amount of data from the non-volatile memory 140, and may write the third key stream ST_KEY3 to the non-volatile memory 140. Therefore, an amount of data input/output with respect to the non-volatile memory 140, for performing the compaction operation, may be reduced.

Figure 15:
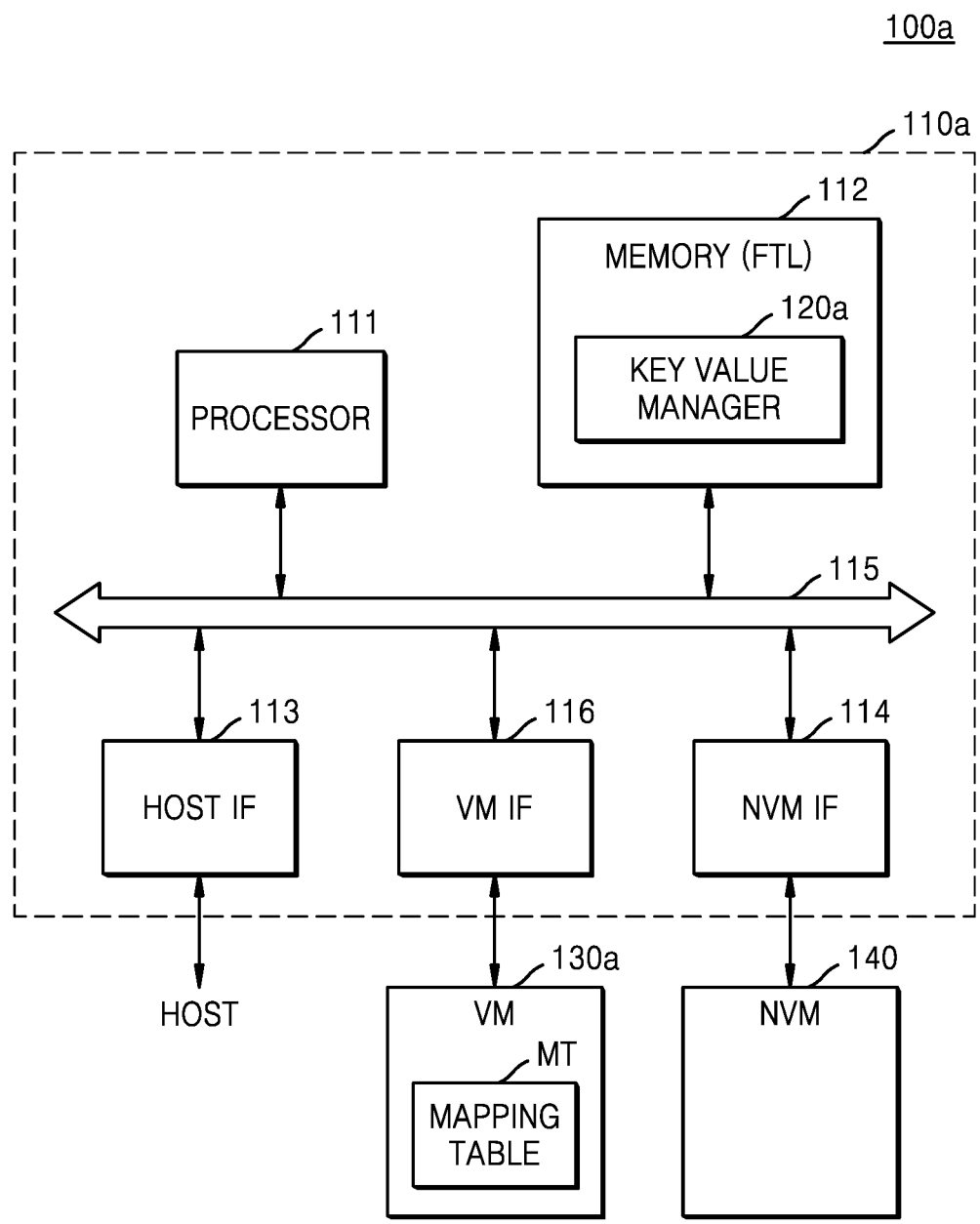
FIG. 15 is a block diagram illustrating a storage device according to an example embodiment of the inventive concept.

FIG. 15 is a block diagram illustrating a storage device according to one embodiment of the inventive concept.

Referring to FIG. 15, a storage device 100a may include a controller 100a, volatile memory 130a, and the non-volatile memory 140. In addition, the controller 110a may include a processor 111, memory 112, a host interface 113, a volatile memory interface 116, and a non-volatile memory interface 114, and these components may communicate with each other via a bus 115.

The processor 111 may include a CPU, a microprocessor, or the like and may control an overall operation of the controller 110. The memory 112 may be operated according to control by the processor 111 and may be used as operation memory, buffer memory, cache memory, or the like. For example, the memory 112 may be implemented with volatile memory, such as DRAM or SRAM, or non-volatile memory, such as PRAM or flash memory.

A key-value manager 120a may be implemented in firmware or software and may be loaded onto the memory 112. In one embodiment, the key-value manager 120a may be implemented in a flash translation layer (FTL) and may be loaded onto the memory 112. However, the inventive concept is not limited thereto, and the key-value manager 120a may be implemented in hardware. The operations described with reference to FIGS. 1 to 12 may be performed by the processor 111 by using the key-value manager 120a.

The host interface 113 may provide an interface between the host 200 and the controller 110, for example, an interface according to Universal Serial Bus (USB), Multimedia Card (MMC), Peripheral Component Interconnect Express (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), Integrated Drive Electronics (IDE), or the like. The non-volatile memory interface 114 may provide an interface between the controller 110a and the non-volatile memory 140. For example, a key stream or a value stream may be transmitted and received between the controller 110a and the non-volatile memory 140 via the non-volatile memory interface 114.

The volatile memory interface 116 may provide an interface between the controller 110a and the volatile memory 130a. For example, a key table, a value table, or a mapping table MT may be transmitted and received between the controller 110a and the volatile memory 130a.

The volatile memory 130a may store the mapping table MT. In one example, the volatile memory 130a, like the data buffer 130 of FIG. 2, may further store keys and values. For this purpose, the volatile memory 130a may be implemented with DRAM. The mapping table MT may include one of the hash table, the key table, and the value table, which have been described with reference to FIGS. 1 to 14.

According to the inventive concept, the key-value manager 120a may perform various operations (for example, a compaction operation and a garbage collection operation) on keys and values without the intervention of both a file system interface of the host 200 or an operating system (OS) and a layer of a block device, and thus, a data processing speed may be increased.

Figure 16:
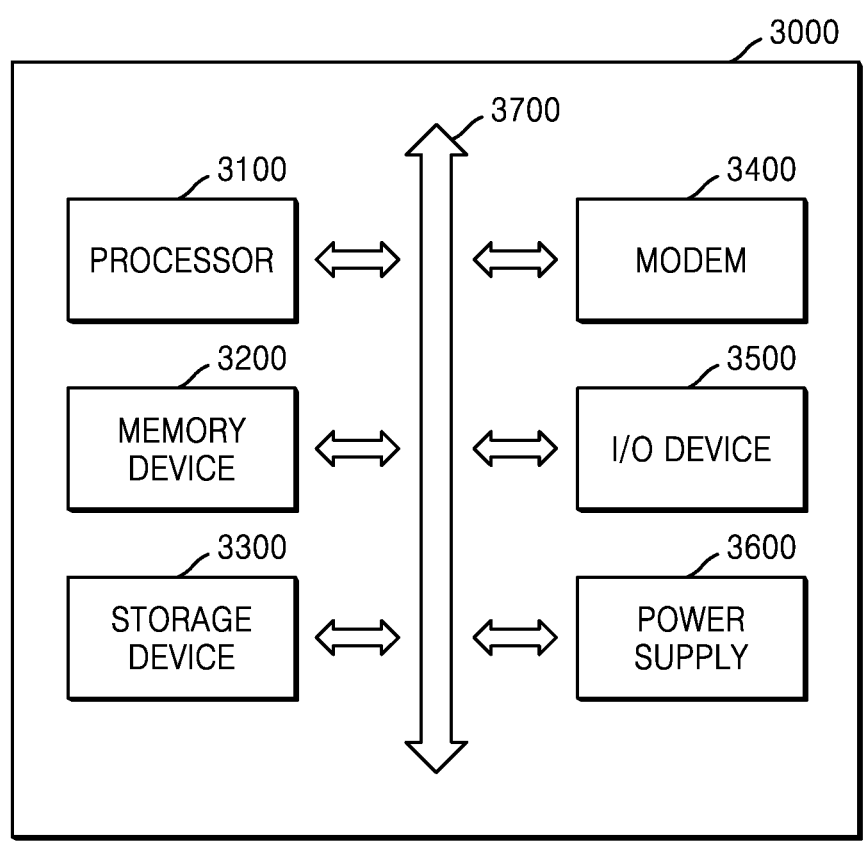
FIG. 16 is a block diagram illustrating an electronic device according to an example embodiment of the inventive concept.

FIG. 16 is a block diagram illustrating an electronic device according to an example embodiment of the inventive concept.

Referring to FIG. 16, an electronic device 3000 may include a processor 3100, a memory device 3200, a storage device 3300, a modem 3400, an input/output device 3500, and a power supply 3600. In one embodiment, the storage device 3300 may be implemented by using the embodiments described with reference to FIGS. 1 to 15.

In one embodiment, the storage device 3300 may receive, from a host, key-value pairs including a plurality of keys and a plurality of values respectively corresponding to the plurality of keys, and may separate the plurality of keys and the plurality of values from the key-value pairs.

In one embodiment, the storage device 3300 may generate a key stream by coupling an index corresponding to each value to each of the plurality of keys and merging the plurality of keys to which indices are respectively coupled. In addition, the storage device 3300 may generate a value stream by merging the plurality of values. Further, the storage device 3300 may store the generated key stream and the generated value stream in a non-volatile memory device.

In one embodiment, the storage device 3300 may perform only data access to the key stream without data access to the value stream in the process of compaction, thereby deleting invalid keys and generating the key stream including valid keys. Therefore, in the process of compaction by the storage device 3300, an amount of access data with respect to the non-volatile memory device may be reduced and a data processing speed may be increased.

In one embodiment, the storage device 3300 may further include, in a mapping table indicating storage locations of the key stream and the value stream, validity bits indicating whether each of the key stream and the value stream is valid or not. Therefore, the storage device 3300 may efficiently perform garbage collection on the key stream and the value stream.

In one embodiment, the storage device 3300 may perform the aforementioned operations by itself without receiving a command from the processor 3100.

While the inventive concept has been particularly shown and described with reference to embodiments thereof, it will be understood that various changes in form and details may be made therein without departing from the spirit and scope of the following claims.

What is claimed is:

1. A storage device comprising:
a controller configured to:
receive, from a host, a plurality of key-value pairs,
separate a key from each of the plurality of key-value pairs and a value therefrom and store the key in a key buffer and the value in a value buffer, and
generate a first key stream by merging a plurality of keys separated from the plurality of key-value pairs; and
non-volatile memory configured to store the first key stream,
wherein the first key stream is stored, separately from the value separated from each of the plurality of key-value pairs, in the non-volatile memory,
wherein the controller, in response to a compaction command from the host, reads the first key stream and a second key stream from the non-volatile memory, generates a third key stream by merging first valid keys of the first key stream and second valid keys of the second key stream, and stores the third key stream in the non-volatile memory,
wherein the controller generates the third key stream by merging first valid keys of the first key stream and second valid keys of the second key stream, and
wherein each of the first and second valid keys correspond to a value to which an erase command is not issued by the host, among values.

2. The storage device of claim 1,
wherein the controller is further configured to generate the first key stream by merging a key of a corresponding one of the plurality of key-value pairs with an index corresponding to a value of the corresponding one of the plurality of key-value pairs.

3. The storage device of claim 1, wherein
the controller is further configured to generate a value stream by merging a plurality of values separated from the plurality of key-value pairs, and to store the value stream in the non-volatile memory, and
the value stream is stored, separately from the first key stream, in the non-volatile memory.

4. The storage device of claim 1, further comprising:
a volatile memory configured to store a hash table and a value table, the hash table comprising physical addresses of the first to third key streams in the non-volatile memory, and the value table comprising a physical address of the value stream in the non-volatile memory.

5. An operating method of a storage device which comprises non-volatile memory and a controller controlling the non-volatile memory,
the operating method comprising:
receiving, by the controller, a plurality of key-value pairs;
generating, by the controller, a first key stream by extracting a key from each of the plurality of key-value pairs, wherein the extracted key is stored in a key buffer;
storing, by the controller, the first key stream in the non-volatile memory;
generating, by the controller, a value stream by extracting a value from each of the plurality of key-value pairs, wherein the extracted value is stored in a value buffer;
storing, by the controller, the value stream in the non-volatile memory; and
performing a compaction operation, the compaction operation including:
reading, from the non-volatile memory, the first key stream and a second key stream;
generating a third key stream by merging the first key stream with the second key stream; and
storing the third key stream in the non-volatile memory,
wherein the generating of the third key stream comprises:
generating the third key stream by extracting first valid keys from the first key stream and second valid keys from the second key stream, and
wherein each of the first and second valid keys corresponds to a value to which an erase command is not issued by a host, among a plurality of values.

6. The operating method of claim 5, wherein
the generating of the first key stream comprises:
generating an index for a value of a corresponding one of the plurality of key-value pairs; and
merging a key of the corresponding one of the plurality of key-value pairs with the index.

7. The operating method of claim 5, further comprising:
generating, by the controller, a hash table comprising information about a storage location of at least one of the first to third key streams in the non-volatile memory; and
updating, by the controller, the hash table with invalid keys corresponding to invalid values, to which the erase command is issued by the host.

8. The operating method of claim 7, further comprising:
generating, by the controller, a value table comprising physical addresses for the plurality of values and at least one validity bit each of which indicates whether a corresponding value is valid; and
updating, by the controller, the value table with validity bits for values corresponding to the invalid keys.

9. The operating method of claim 8, further comprising:
performing, by the controller, garbage collection on the values corresponding to the invalid keys by using the at least one validity bit of the value table.

10. The operating method of claim 9, further comprising:
generating, by the controller, a value table which comprises:
a physical address for at least one value comprised in the value stream; and
a plurality of validity bits indicating whether the plurality of values comprised in the value stream are valid.

* * * * *